(12) United States Patent
Shaw et al.

(10) Patent No.: US 9,830,037 B2
(45) Date of Patent: *Nov. 28, 2017

(54) INPUT DEVICE BACKLIGHTING

(71) Applicant: Microsoft Technology Licensing, LLC, Redmond, WA (US)

(72) Inventors: Timothy C. Shaw, Austin, TX (US); Richard D. Harley, Sammamish, WA (US); Xuezhong Wu, Bellevue, WA (US); Bradley R. Martin, Auburn, WA (US); Kurt A. Jenkins, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,636

(22) Filed: Jul. 6, 2016

(65) Prior Publication Data

US 2016/0313832 A1    Oct. 27, 2016

Related U.S. Application Data

(63) Continuation of application No. 14/033,290, filed on Sep. 20, 2013, now Pat. No. 9,411,436.

(51) Int. Cl.
*G02B 6/00* (2006.01)
*G06F 3/044* (2006.01)
(Continued)

(52) U.S. Cl.
CPC ............ *G06F 3/044* (2013.01); *G02B 6/0011* (2013.01); *G02B 6/0038* (2013.01);
(Continued)

(58) Field of Classification Search
None
See application file for complete search history.

(56) References Cited

U.S. PATENT DOCUMENTS

| 5,489,900 A | 2/1996 | Cali et al. |
| 5,942,733 A | 8/1999 | Allen et al. |

(Continued)

OTHER PUBLICATIONS

"Corrected Notice of Allowance", U.S. Appl. No. 14/033,290, dated Jul. 13, 2016, 2 pages.
(Continued)

*Primary Examiner* — Tina Wong

(57) ABSTRACT

Input device backlighting techniques are described. In one or more implementations, an input device includes a light guide configured to transmit light, a sensor assembly having a plurality of sensors that are configured to detect proximity of an object as a corresponding one or more inputs, a connection portion configured to form a communicative coupling to a computing device to communicate the one or more inputs received by the sensor assembly to the computing device, and an outer layer. The outer layer has a plurality of indications of inputs formed using openings in the outer layer such that light from the light guide is configured to pass through the openings to function as a backlight. The outer layer also has a plurality of sub-layers arranged to have increasing levels of resistance to transmission of the light from the light guide, one to another.

20 Claims, 8 Drawing Sheets

(51) Int. Cl.

| | | |
|---|---|---|
| *G06F 3/023* | (2006.01) | |
| *G06F 3/0346* | (2013.01) | |
| *H04M 1/22* | (2006.01) | |
| *G06F 1/16* | (2006.01) | |
| *G06F 3/02* | (2006.01) | |
| *F21V 8/00* | (2006.01) | |
| *G06F 3/041* | (2006.01) | |

(52) U.S. Cl.
CPC .......... *G06F 1/1632* (2013.01); *G06F 1/1669* (2013.01); *G06F 1/1683* (2013.01); *G06F 3/021* (2013.01); *G06F 3/0202* (2013.01); *G06F 3/023* (2013.01); *G06F 3/0346* (2013.01); *G06F 3/0414* (2013.01); *H04M 1/22* (2013.01); *H01H 2219/062* (2013.01)

(56) References Cited

U.S. PATENT DOCUMENTS

| | | | |
|---|---|---|---|
| 6,239,786 | B1 | 5/2001 | Burry et al. |
| 6,758,615 | B2 | 7/2004 | Monney et al. |
| 6,977,352 | B2 | 12/2005 | Oosawa |
| 7,557,312 | B2 | 7/2009 | Clark et al. |
| 7,736,042 | B2 | 6/2010 | Park et al. |
| 8,232,963 | B2 | 7/2012 | Orsley et al. |
| 8,330,061 | B2 | 12/2012 | Rothkopf et al. |
| 8,330,742 | B2 | 12/2012 | Reynolds et al. |
| 8,378,972 | B2 | 2/2013 | Pance et al. |
| 8,403,576 | B2 | 3/2013 | Merz |
| 8,831,677 | B2 | 9/2014 | Villa-Real |
| 8,847,897 | B2 | 9/2014 | Sakai et al. |
| 9,411,436 | B2 * | 8/2016 | Shaw .................. G06F 3/023 |
| 9,459,160 | B2 | 10/2016 | Shaw et al. |
| 2009/0200148 | A1 | 8/2009 | Honmatsu et al. |
| 2009/0284397 | A1 | 11/2009 | Lee et al. |
| 2010/0137033 | A1 | 6/2010 | Lee |
| 2011/0037379 | A1 | 2/2011 | Lecamp et al. |
| 2011/0084909 | A1 | 4/2011 | Hsieh et al. |
| 2012/0055770 | A1 | 3/2012 | Chen |
| 2012/0299866 | A1 | 11/2012 | Pao et al. |
| 2013/0044059 | A1 | 2/2013 | Fu |
| 2013/0227836 | A1 | 9/2013 | Whitt, III et al. |
| 2013/0228433 | A1 | 9/2013 | Shaw |
| 2013/0229356 | A1 | 9/2013 | Marwah et al. |
| 2014/0008203 | A1 | 1/2014 | Nathan et al. |
| 2014/0020484 | A1 | 1/2014 | Shaw et al. |
| 2014/0062933 | A1 | 3/2014 | Coulson et al. |
| 2014/0062934 | A1 | 3/2014 | Coulson et al. |
| 2014/0085247 | A1 | 3/2014 | Leung et al. |
| 2014/0232679 | A1 | 8/2014 | Whitman et al. |
| 2014/0253305 | A1 | 9/2014 | Rosenberg et al. |
| 2014/0306914 | A1 | 10/2014 | Kagayama |
| 2015/0084865 | A1 | 3/2015 | Shaw et al. |
| 2015/0084909 | A1 | 3/2015 | Worfolk et al. |
| 2015/0160778 | A1 | 6/2015 | Kim et al. |
| 2015/0193034 | A1 | 7/2015 | Jeong et al. |
| 2015/0242012 | A1 | 8/2015 | Petcavich et al. |
| 2015/0301642 | A1 | 10/2015 | Hanauer et al. |
| 2016/0070398 | A1 | 3/2016 | Worfolk |
| 2017/0023418 | A1 | 1/2017 | Shaw et al. |

OTHER PUBLICATIONS

"Corrected Notice of Allowance", U.S. Appl. No. 14/033,508, dated Jun. 16, 2016, 2 pages.

"Corrected Notice of Allowance", U.S. Appl. No. 14/698,318, dated Jun. 9, 2016, 2 pages.

"Examiner's Answer to Appeal Brief", U.S. Appl. No. 13/974,994, dated May 18, 2016, 40 pages.

"International Preliminary Report on Patentability", Application No. PCT/US2014/056185, dated Dec. 23, 2015, 7 pages.

"International Search Report and Written Opinion", Application No. PCT/US2014/056185, dated Dec. 4, 2014, 10 pages.

"International Search Report and Written Opinion", Application No. PCT/US2015/067754, dated Apr. 7, 2016, 13 pages.

"International Search Report and Written Opinion", Application No. PCT/US2016/025966, dated Jun. 15, 2016, 15 pages.

"Non-Final Office Action", U.S. Appl. No. 13/975,087, dated May 10, 2016, 18 pages.

"Non-Final Office Action", U.S. Appl. No. 14/033,290, dated Dec. 3, 2015, 7 pages.

"Non-Final Office Action", U.S. Appl. No. 14/033,508, dated Dec. 3, 2015, 14 pages.

"Non-Final Office Action", U.S. Appl. No. 14/591,704, dated Jun. 7, 2016, 32 pages.

"Notice of Allowance", U.S. Appl. No. 14/033,290, dated Mar. 30, 2016, 5 pages.

"Notice of Allowance", U.S. Appl. No. 14/033,508, dated May 6, 2016, 9 pages.

"Notice of Allowance", U.S. Appl. No. 14/698,318, dated May 6, 2016, 13 pages.

"Second Written Opinion", Application No. PCT/US2014/056185, dated Sep. 15, 2015, 5 pages.

"Visus Photonics—Visionary Technologies New Generation of Production Ready Keyboard—Keypad Illumination Systems", Available at: <http://www.visusphotonics.com/pdf/appl_keypad_keyboard_backlights.pdf>, May 2006, pp. 1-22.

"Corrected Notice of Allowance", U.S. Appl. No. 14/033,508, dated Sep. 9, 2016, 2 pages.

"Non-Final Office Action", U.S. Appl. No. 15/283,913, dated Feb. 10, 2017, 20 pages.

"Corrected Notice of Allowance", U.S. Appl. No. 15/283,913, dated Sep. 27, 2017, 2 pages.

"Notice of Allowance", U.S. Appl. No. 15/283,913, dated Sep. 6, 2017, 9 pages.

* cited by examiner

INPUT DEVICE BACKLIGHTING

RELATED APPLICATION

This application is a continuation of and claims priority to U.S. patent application Ser. No. 14/033,290 filed Sep. 20, 2013 entitled "Input Device Backlighting", the disclosure of which is incorporated by reference herein in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Because mobile computing devices are configured to be mobile, however, the mobile devices may be ill suited for intensive data entry operations.

For example, some mobile computing devices provide a virtual keyboard that is accessible using touchscreen functionality of the device. However, it may difficult to perform some tasks using a virtual keyboard such as inputting a significant amount of text, composing a document, and so forth. Moreover, virtual keyboards consume some screen real estate that may otherwise be used to display content. Thus, use of traditional virtual keyboards may be frustrating when confronted with some input scenarios.

SUMMARY

Input device backlighting techniques are described. In one or more implementations, an input device includes a light guide configured to transmit light, a sensor assembly having a plurality of sensors that are configured to detect proximity of an object as a corresponding one or more inputs, a connection portion configured to form a communicative coupling to a computing device to communicate the one or more inputs received by the sensor assembly to the computing device, and an outer layer. The outer layer is disposed proximal to the light guide such that the light guide is positioned between the outer layer and the sensor assembly. The outer layer has a plurality of indications of inputs formed using openings in the outer layer such that light from the light guide is configured to pass through the openings to function as a backlight. The outer layer also has a plurality of sub-layers arranged to have increasing levels of resistance to transmission of the light from the light guide, one to another.

In one or more implementations, an input device includes a light guide configured to transmit light, a sensor assembly having a plurality of sensors that are configured to detect proximity of an object as a corresponding one or more inputs, and an outer layer formed as a fabric. The outer layer has one or more indications of inputs that are configured to be illuminated by the light guide and is positioned such that the light guide is disposed between the sensor assembly and the outer layer. A smoothing layer is disposed between the light guide and the outer layer, the smoothing layer is secured to the outer layer thereby reducing flexibility of the fabric.

In one or more implementations, an input device includes a light source, a light guide configured to transmit light emitted by the light source, a sensor assembly having a plurality of sensors that are configured to detect proximity of an object as corresponding one or more inputs, an outer layer, and a smoothing layer. The outer layer has one or more indications of inputs that are configured to be illuminated by the transmitted light of the light guide and is positioned such that the light guide is disposed between the sensor assembly and the outer layer. The smoothing layer is disposed between the light guide and the outer layer. The smoothing layer includes a protrusion configured to cause the light guide to align with the light source to transmit the light emitted by the light source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile computing devices may be utilized in a wide variety of different scenarios due to their mobile construction, e.g., configured to be held by one or more hands of a user. As previously described, however, conventional techniques that were utilized to interact with these mobile computing devices could be limited when restricted solely to a virtual keyboard. Although supplemental input devices have been developed (e.g., an external keyboard), these devices could be unwieldy and difficult to interact with in mobile scenarios, including difficulties in viewing the input device in these scenarios.

Input device backlighting techniques are described. In one or more implementations, an input device is configured for use with a mobile computing device (e.g., tablet, mobile phone, and so on), such as a keyboard integrated into a cover that is removably connected to the mobile computing device. The input device may include a light guide that is configured to provide backlighting to indications of functions on a surface of the input device. For example, the light guide may be configured as a universal light guide such that different indications (e.g., legends) may be indicated on the surface of the input device to support different languages, configurations, and so on without reconfiguration of the light guide.

Additionally, the input device may be configured to reduce and even eliminate the "bleeding" of light through an outer surface of the input device, which may help support use of the universal light guide. This may include use of inks as part of a smoothing layer at selective locations (e.g., near a light source) to reduce transmission of light. In another example, a plurality of layers having different light transmission properties may be used to preserve a "look and feel" of the input device while reducing transmission of light. For instance, layers of increasingly darker shades of a color may be used to support an outer layer having a light color (e.g., yellow, orange, and so on) while preventing transmission of light from the light guide through these layers. A variety of other examples are also contemplated, including use of a smoothing layers, a light guide alignment mechanism, and so on as further described in the following sections.

In the following discussion, an example environment is first described that may employ the techniques described herein. Examples of layers that are usable in the example environment (i.e., the input device) are then described which may be performed in the example environment as well as other environments. Consequently, use of the example layers is not limited to the example environment and the example environment is not limited to use of the example layers.

Example Environment

Figure 1:
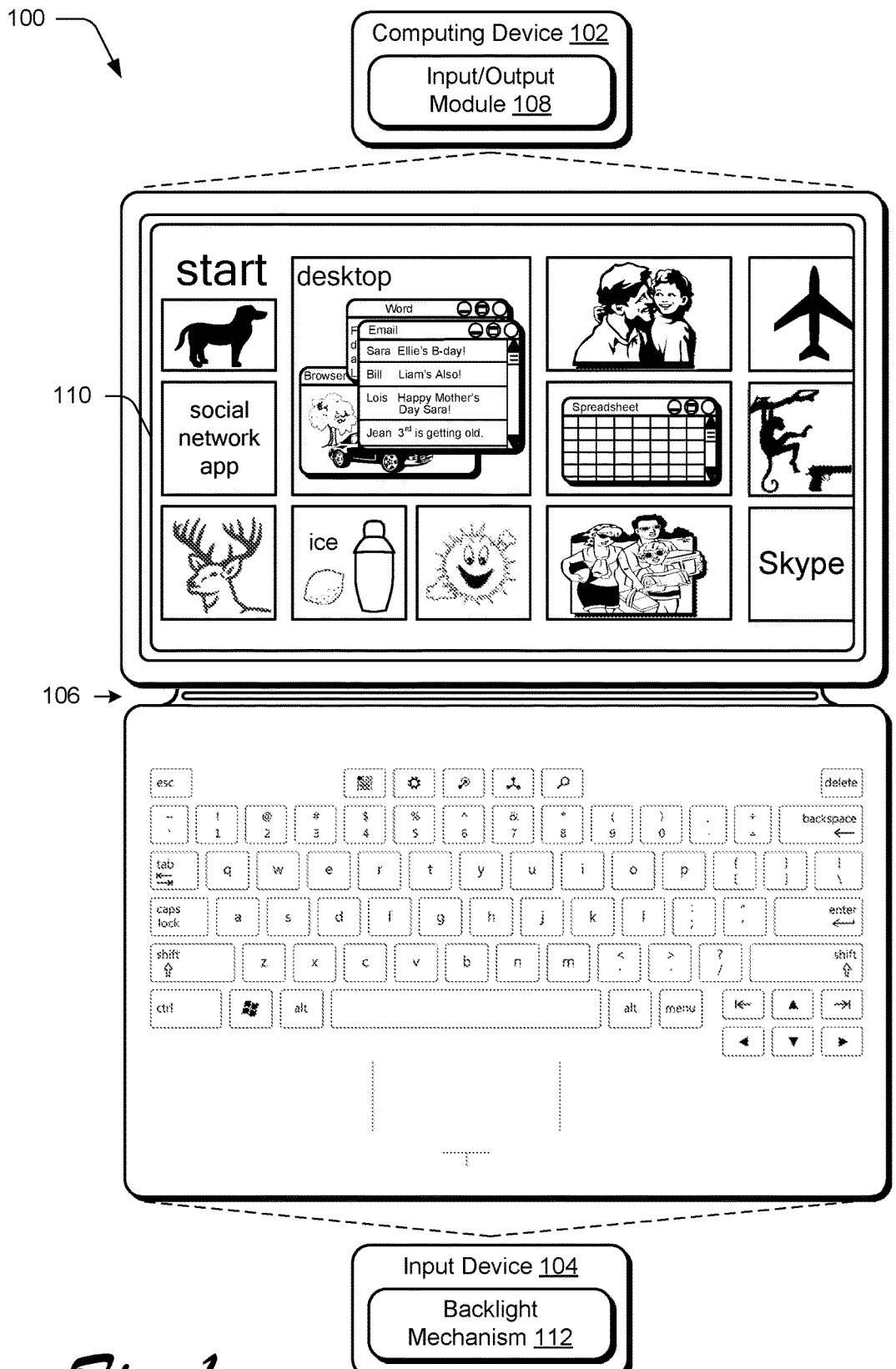
FIG. 1 is an illustration of an environment in an example implementation that is operable to employ the backlight techniques described herein.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on that is configured to be held by one or more hands of a user. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The flexible hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on.

The input device 104 is also illustrated as including a backlight mechanism 112. The backlight mechanism 112 is representative of functionality that is configured to emit light from a surface of the input device 104, such as to illuminate indications of inputs (e.g., letters of the keyboard as well as a border of the keys, track pad, and so on). In this way, the indications may be viewed in low light conditions. The backlight mechanism 112 may be implemented in a variety of ways, further discussion of which may be found beginning in relation to the discussion of FIG. 4 which follows further discussion of an example of the input device 102 as follows.

Figure 2:
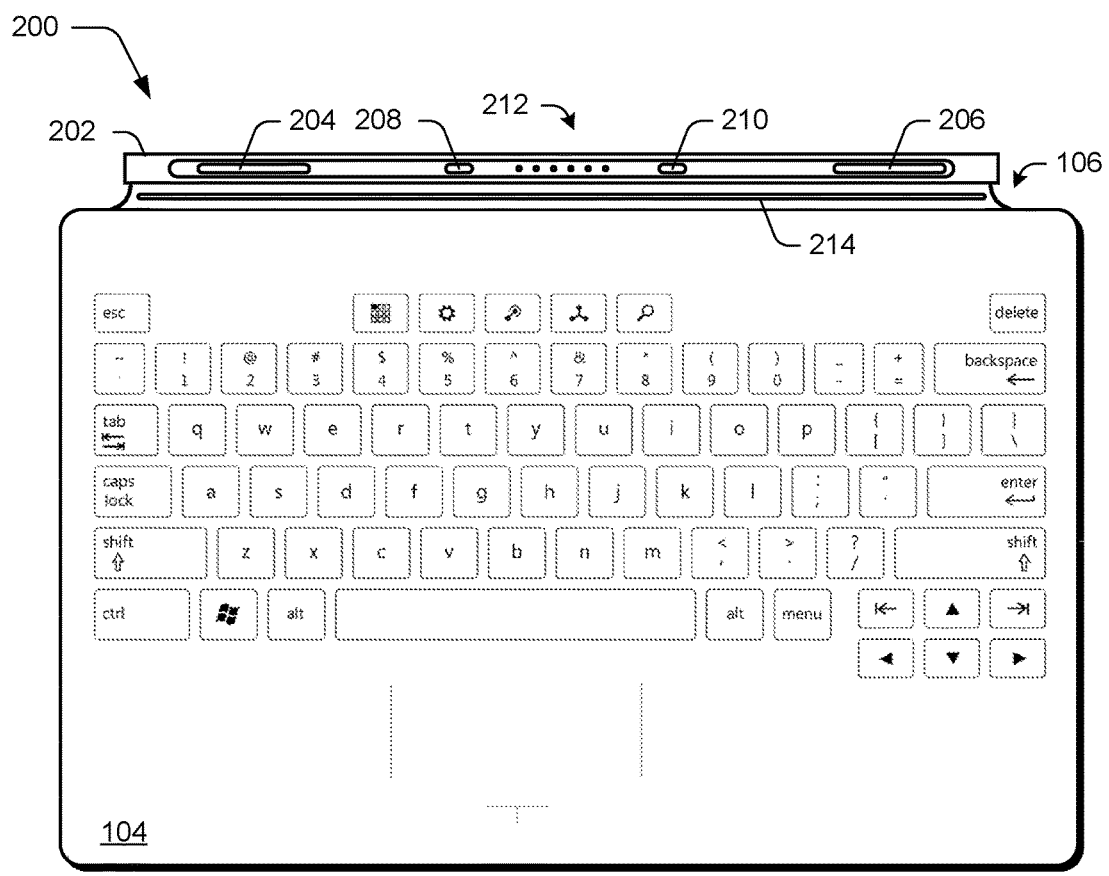
FIG. 2 depicts an example implementation of an input device of FIG. 1 as showing a flexible hinge in greater detail.

FIG. 2 depicts an example implementation 200 of the input device 104 of FIG. 1 as showing the flexible hinge 106 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the flexible hinge 106. Thus, when the connection portion 202 is physically connected to the computing device 102 the combination of the connection portion 202 and the flexible hinge 106 supports movement of the input device 104 in relation to the computing device 102 that is similar to a hinge of a book.

Through this rotational movement, a variety of different orientations of the input device 104 in relation to the computing device 102 may be supported. For example, rotational movement may be supported by the flexible hinge 106 such that the input device 104 may be placed against the display device 110 of the computing device 102 and thereby act as a cover. Thus, the input device 104 may act to protect the display device 110 of the computing device 102 from harm.

The connection portion 202 may be secured to the computing device in a variety of ways, an example of which is illustrated as including magnetic coupling devices 204, 206 (e.g., flux fountains), mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the input device 104 may be physically secured to the computing device 102 through use of magnetic attraction.

The connection portion 202 also includes mechanical coupling protrusions 208, 210 to form a mechanical physical connection between the input device 104 and the computing device 102. The mechanical coupling protrusions 208, 210 are shown in greater detail in relation to FIG. 3, which is discussed below.

Figure 3:
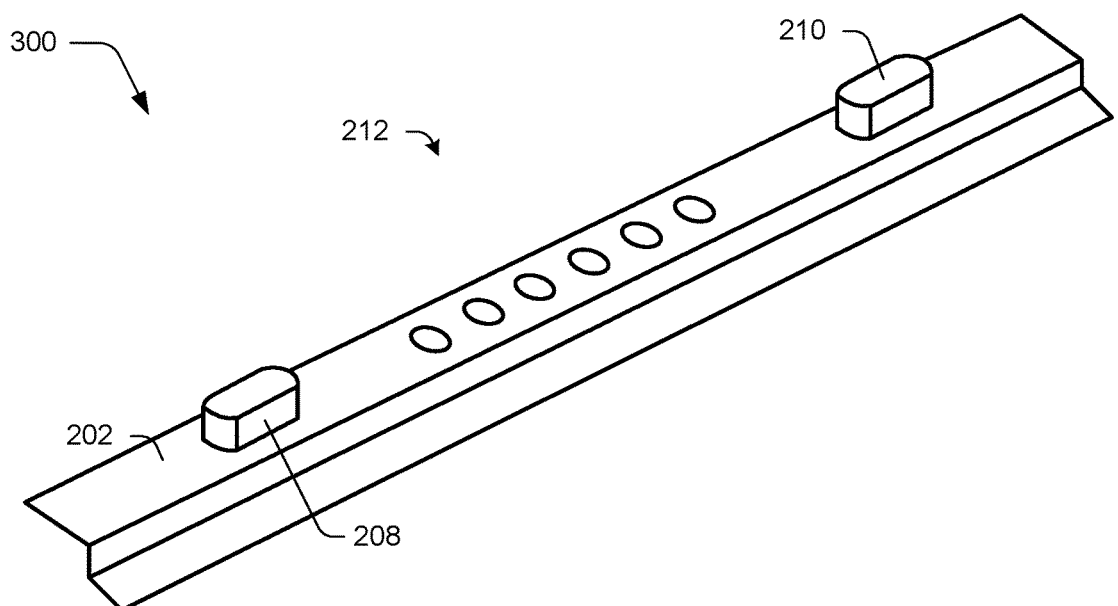
FIG. 3 depicts an example implementation showing a perspective view of a connection portion of FIG. 2 that includes mechanical coupling protrusions and a plurality of communication contacts.

FIG. 3 depicts an example implementation 300 showing a perspective view of the connection portion 202 of FIG. 2 that includes the mechanical coupling protrusions 208, 210 and the plurality of communication contacts 212. As illustrated, the mechanical coupling protrusions 208, 210 are configured to extend away from a surface of the connection portion 202, which in this case is perpendicular although other angles are also contemplated.

The mechanical coupling protrusions 208, 210 are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity.

The connection portion 202 is also illustrated as including a plurality of communication contacts 212. The plurality of communication contacts 212 is configured to contact corresponding communication contacts of the computing device 102 to form a communicative coupling between the devices as shown. The connection portion 202 may be configured in a variety of other ways, including use of a rotational hinge, mechanical securing device, and so on. In the following, an example of a docking apparatus 112 is described and shown in a corresponding figure.

Figure 4:
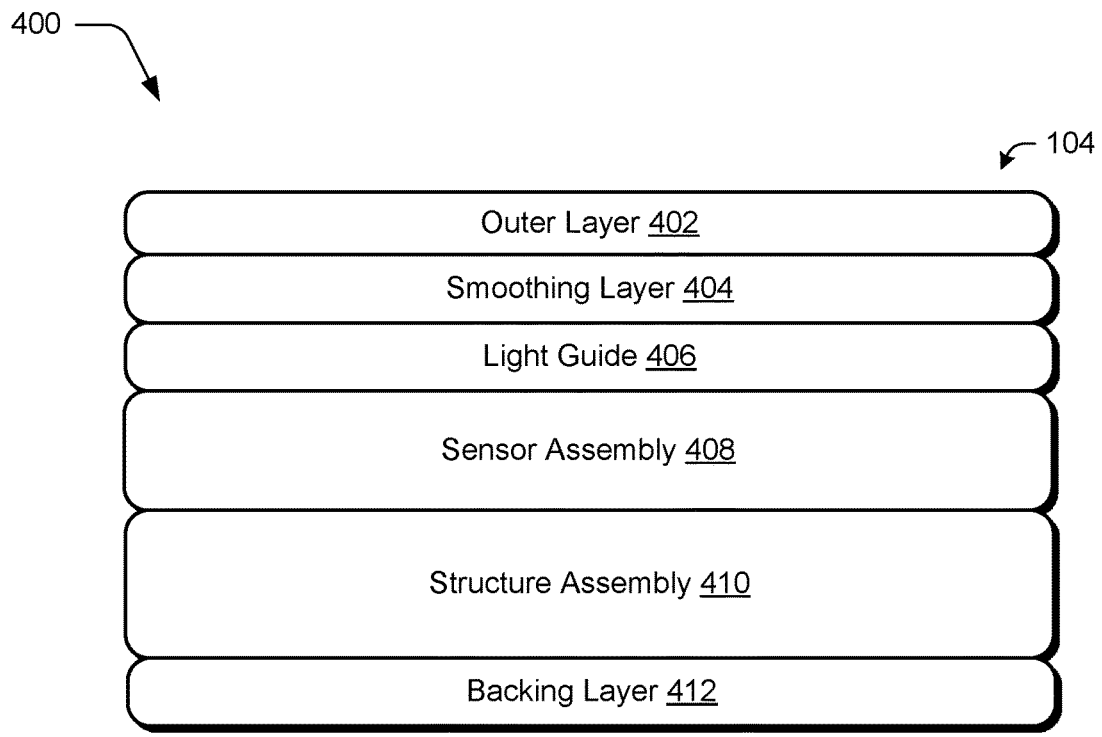
FIG. 4 depicts an example implementation showing a cross section of the input device of FIG. 1.

FIG. 4 depicts an example implementation 400 showing a cross section of input device 104 of FIG. 1. The outer layer 402 is configured to supply an outer surface of the input device 104 with which a user may touch and interact. The outer layer 402 may be formed in a variety of ways, such as from a fabric material (e.g., a backlight compatible polyurethane with a heat emboss for key formation) as further described beginning in relation to FIG. 6.

Beneath the outer layer is a smoothing layer 404. The smoothing layer 404 may be configured to support a variety of different functionality. This may include use as a support to reduce wrinkling of the outer layer 402, such as through formation as a thin plastic sheet, e.g., approximately 0.125 millimeters of polyethylene terephthalate (PET), to which the outer layer 402 is secured through use of an adhesive. The smoothing layer 404 may also be configured to including masking functionality to reduce and even eliminate unwanted light transmission, e.g., "bleeding" of light through the smoothing layer 404 and through a fabric outer layer 402. The smoothing layer also provides a continuous surface under the outer layer, such that it hides any discontinuities or transitions between the inner layers.

A light guide 406 is also illustrated, which may be included as part of the backlight mechanism 112 of FIG. 2 to support backlighting of indications (e.g., legends) of inputs of the input device 104. This may include illumination of keys of a keyboard, game controls, gesture indications, and so on. The light guide 406 may be formed in a variety of ways, such as from a 250 micron thick sheet of a plastic, e.g., a clear polycarbonate material with etched texturing. Additional discussion of the light guide 406 may be found beginning in relation to FIG. 5.

A sensor assembly 408 is also depicted. Thus, as illustrated the light guide 406 and the smoothing layer 404 are disposed between the outer layer 402 and the sensor assembly 408. The sensor assembly 408 is configured detect proximity of an object to initiate an input. The detected input may then be communicated to the computing device 102 (e.g., via the connection portion 202) to initiate one or more operations of the computing device 102. The sensor assembly 408 may be configured in a variety of ways to detect proximity of inputs, such as a capacitive sensor array, a plurality of pressure sensitive sensors (e.g., membrane switches using a pressure sensitive ink), mechanical switches, a combination thereof, and so on.

A structure assembly 410 is also illustrated. The structure assembly 410 may be configured in a variety of ways, such as a trace board and backer that are configured to provide rigidity to the input device 104, e.g., resistance to bending and flexing. A backing layer 412 is also illustrated as providing a rear surface to the input device 104. The backing layer 412, for instance, may be formed from a fabric similar to an outer layer 402 that omits one or more sub-layers of the outer layer 402, e.g., a 0.38 millimeter thick fabric made of wet and dry layers of polyurethane Although examples of layers have been described, it should be readily apparent that a variety of other implementations are also contemplated, including removal of one or more of the layers, addition of other layers (e.g., a dedicated force concentrator layer, mechanical switch layer), and so forth. Thus, the following discussion of examples of layers is not limited to incorporation of those layer in this example implementation 400 and vice versa.

Figure 5:
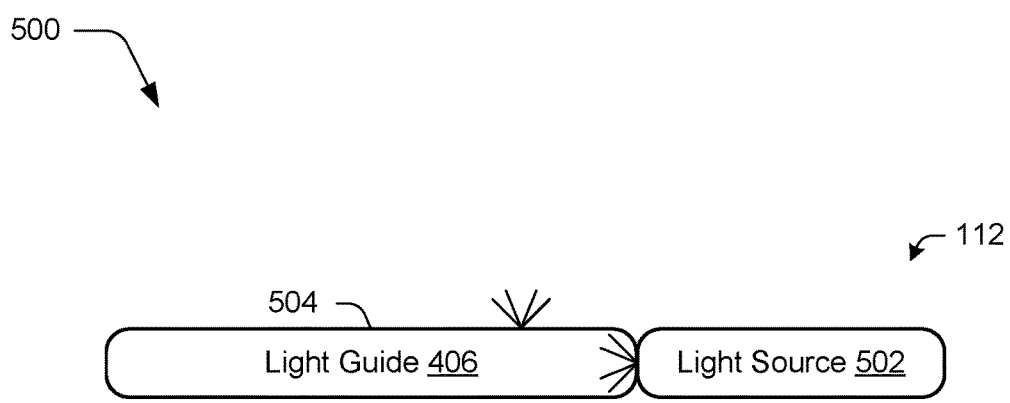
FIG. 5 depicts an example implementation of the backlight mechanism of FIG. 1 as including a light guide of FIG. 4 and a light source.

FIG. 5 depicts an example implementation 500 of the backlight mechanism of FIG. 1 as including a light guide 406 of FIG. 4 and a light source. As previously described, the light guide 406 may be configured in a variety of ways to support transmission of light that is to act as a backlight for the input device 102. For example, the light guide 406 may be configured from a clear plastic or other material that supports transmission of light from a light source 502, which may be implemented using one or more light emitting diodes (LEDs). The light guide 406 is positioned to receive the emitted light from the light source 502 through a side of the light guide 406 and emit the light through one or more other sides and/or surface regions of the light guide 406.

The light guide 406, for instance, may be configured to output light at specific locations through use of etching, embossing, contact by another material having a different refractive index (e.g., an adhesive disposed on the plastic of the light guide 406), and so on. In another example, the light guide 406 may be configured as a universal light guide such that a majority (and even entirety) of a surface of the light guide 406 may be configured output light, e.g., through etching of a majority of a surface 504 of the light guide 406. Thus, instead of specially configuring the light guide 406 in this example, the same light guide maybe used to output different indications of inputs, which may be used to support different languages, arrangements of inputs, and so on by the input device 104.

As previously described, however, this could cause bleeding of light through adjacent surfaces to the light guide in conventional techniques, such as through an outer layer 402 of fabric to give a "galaxy" effect, pinholes, and so on. Accordingly, one or more of these adjacent layers may be configured to reduce and even prevent transmission of light in undesirable locations, an example of which that involves configuration of the outer layer 402 is described as follows and shown in a corresponding figure.

Figure 6:
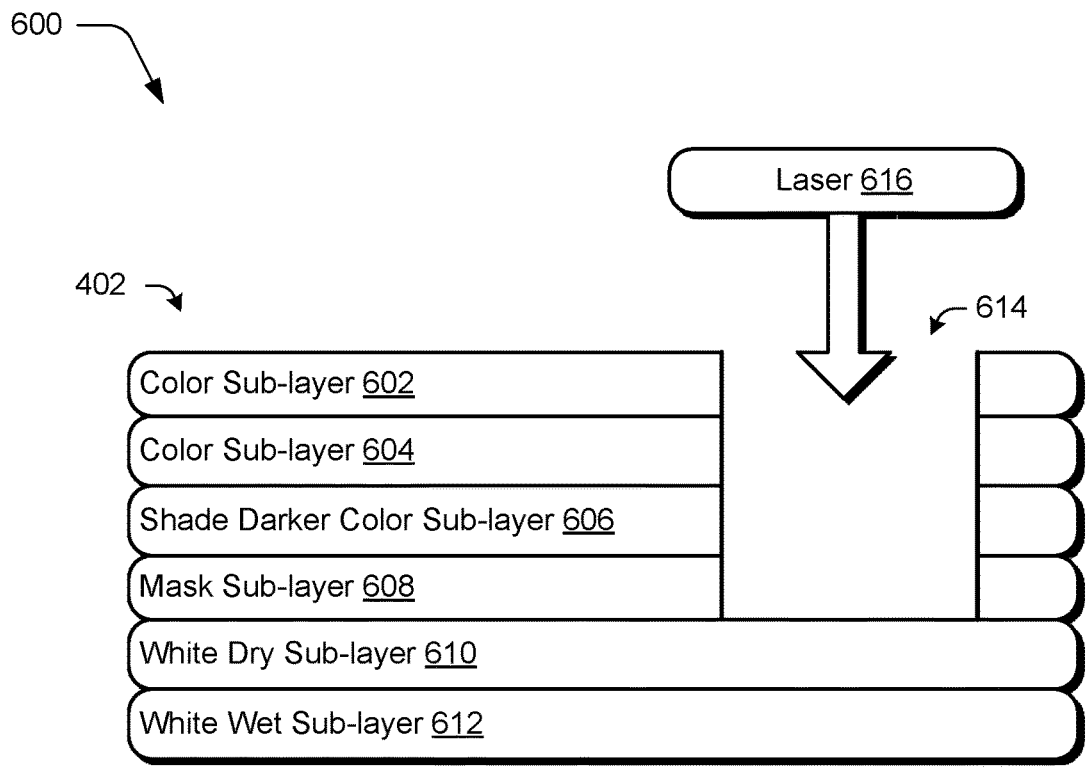
FIG. 6 depicts an example implementation in which the outer layer of FIG. 4 is shown in greater detail.

FIG. 6 depicts an example implementation 600 in which the outer layer 402 of FIG. 4 is shown in greater detail. In this example, color sub-layers 602, 604 are illustrated which may be formed from fabrics and form an outer surface of the outer layer 402, e.g., a surface that may be viewed and contacted by a user of the input device 104. Below these is a shade darker color sub-layer 606 and a mask sub-layer 608. Thus, in this example the layers get progressively darker to provide increasing amounts of resistance to light transmission the closer the layer is positioned to the light guide 408 of FIG. 4. This may be used to support a variety of different functionality.

For instance, lighter colors may be configured to block less light and therefore use of these lighter colors by the input device 104 may cause additional light to "bleed" through these layers. However, in some instances it may be desirable to use a light color at the outer layer 402, e.g., to create a red, yellow, orange, tan or other light colored input device. Additionally, if a significantly darker layer is disposed immediately beneath this fabric layer (e.g., to prevent light transmission by using a dark charcoal or black layer for the mask sub-layer 608), that darker layer may also be viewable through the lighter-colored fabric.

Accordingly, the share-darker color sub-layer 606 may be utilized that is the same or similar (e.g., complimentary) in color to the color used by the color sub-layer 602, 604 but is a shade darker than those layers. In this way, the appearance of the color sub-layers 602, 604 may be maintained (e.g., such that the mask sub-layer 608 is not viewable through this layer) and yet provide for reduced transmission of light emitted from the light guide 408 of FIG. 4, such as to support use of a universal light guide as previously described. The mask sub-layer 608 may be configured in a variety of ways, such as to have a color of the shade darker color sub-layer 606 yet still be a darker shade than that layer, a different color configured to offer increased light absorption (e.g., a dark charcoal or black color as previously described), and so on. Thus, the closer the sub-layer is to the light guide 406 of FIG. 4 for these four sub-layers the greater the resistance to transmission of light from the light guide 406.

A white dry sub-layer 610 and a white wet layer 612 are illustrated as disposed beneath the mask sub-layer 608. The white dry sub-layer 610 may be formed from a a dry polyurethane that is bonded to a white wet layer 612, formed from a wet bath of polyurethane. The white wet layer 612 may contain an embedded woven material that may be used to acts as a carrier and provide tensile and structural properties to the outer layer 402 and may be utilized to provide a plush, cushioned feel to the outer layer 402.

An opening 614 may then be formed through the color sub-layers 602, 604, shade darker color sub-layer 606 and mask sub-layer 608, through which, light from the light guide 406 may pass. The light from the light guide 406 may also illuminate the white dry and wet sub-layer combination 610, 612, e.g., to provide a white backlighting in this example but other colors are also contemplated. The opening 614 may be formed in a variety of ways, such as through use of a laser 616 as illustrated, heat embossing, and so on. In this way, the masking supported by the color sub-layers 602, 604, shade darker color sub-layer 606, and mask sub-layer 608 of the outer layer 402 may support use of light guide 406 in a universal configuration such that different light guides are not utilized for different indications, e.g., different legends for different languages. Other layers may also be configured to support use of the universal light guide configuration, an example of which is described as follows and shown in a corresponding figure.

Figure 7:
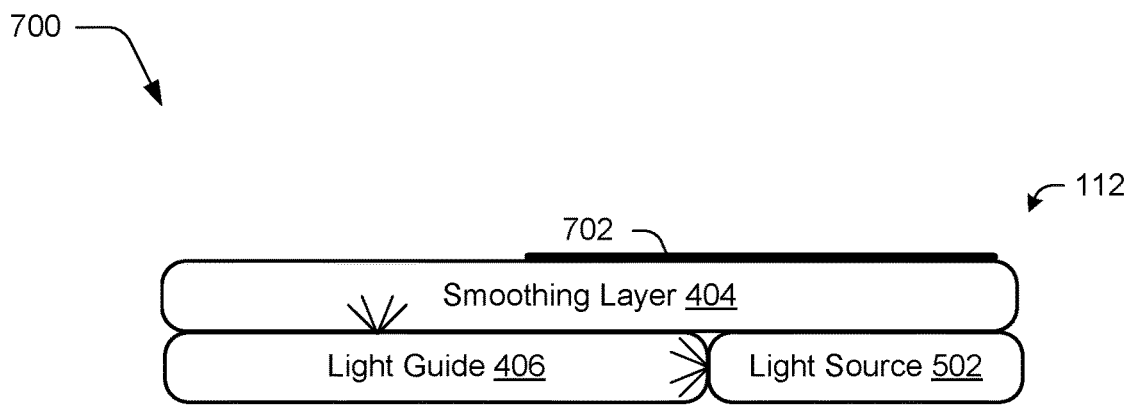
FIG. 7 depicts an example implementation showing a smoothing layer as configured to mask output of light from a light guide and light source.

FIG. 7 depicts an example implementation 700 showing a smoothing layer 404 as configured to mask output of light from a light guide 406 and light source 502. A light guide 406 is illustrated as receiving light from a light source 502 as previously described. The light guide 406 is configured as a universal light guide such that a majority of a surface of the light guide 406 is configured to emit light, e.g., through etching and so on.

The smoothing layer 404 is illustrated as disposed proximal to the surface through which the light is to be emitted. The light source 502 may be configured to output a significant amount of light to provide backlighting to the input device 104, e.g., to illuminate "far away" keys. However, this may also cause light to bleed through the outer layer 402 near the light source 502, even if configured as described in relation to FIG. 6. Accordingly, the smoothing layer 404 may also be configured to support masking at desired locations at which a bleeding of light is likely to occur, such as near the light source 502 in this figure, along the edges of the input device 104, and so on.

The smoothing layer 404 may be configured in a variety of ways to support masking. In the illustration, for instance, an ink 702 is printed on the smoothing layer 404 that is configured to absorb light from the light source 502, e.g., 10-12 microns of black ink. In this way, light sources 502 may be employed for use in backlighting of the input device 104 that have a relatively high intensity without causing light to bleed through a fabric of an outer layer 402 of the input device. Additional discussion of configuration of the smoothing layer to mask light is described as follows and shown in a corresponding figure.

Figure 8:
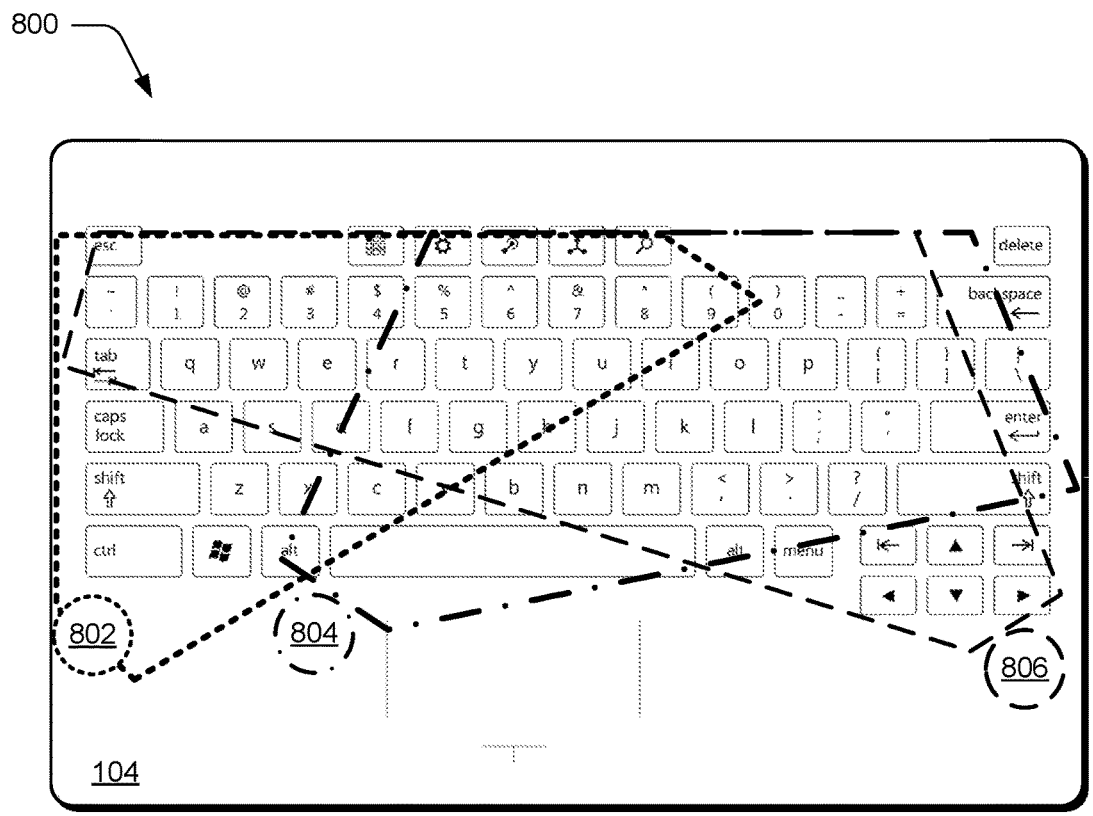
FIG. 8 depicts an example implementation in which positioning of light sources and corresponding masks of a smoothing layer for the input device is shown.
Figure 8:
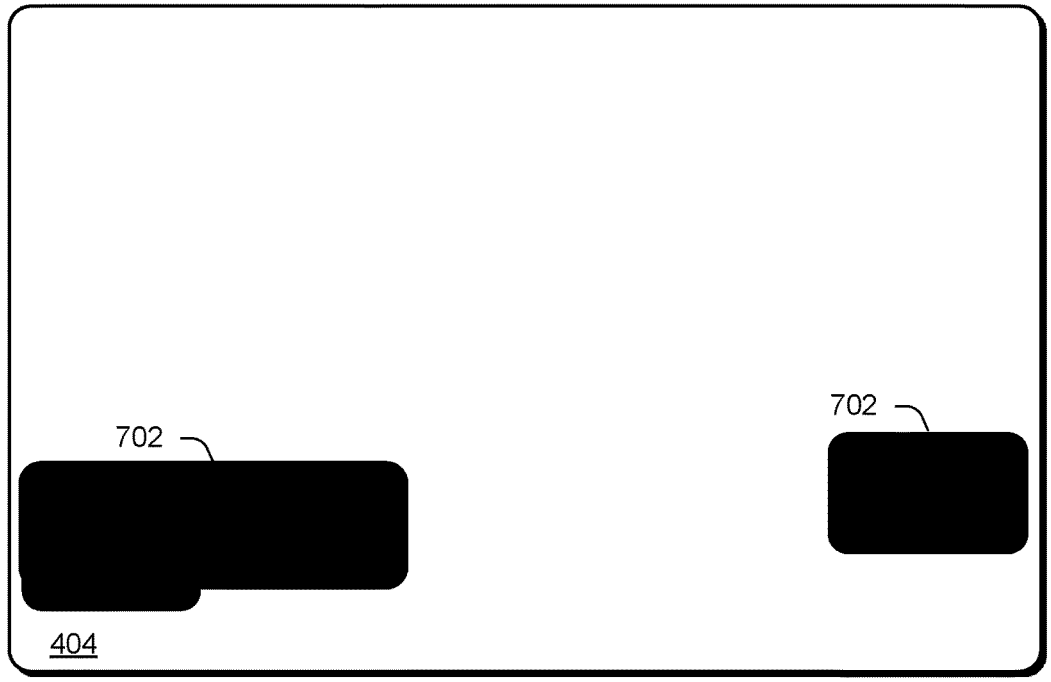

FIG. 8 depicts an example implementation 800 in which positioning of light sources and corresponding masks of a smoothing layer for the input device is shown. In this example, an input device 104 is shown that includes a QWERTY keyboard, although other configurations are also contemplated. The input device 104 includes three light sources 802, 804, 806, which are shown in phantom along with a corresponding transmission pattern of the respective light sources.

To address high intensity light output near the three light sources 802, 804, 806, the smoothing layer 404 may be configured to include masks formed using ink 702 that is to be disposed adjacent to the light sources. In this way, light from the light sources 802, 804, 806 may be masked from transmission through a surface of the input device 104. It should be readily apparent that a wide variety of different arrangements of light sources and masks are also contemplated without departing from the spirit and scope thereof, such as to apply the mask along a perimeter of the smoothing layer 404 to reduce bleeding of light at the edges of the input device.

Figure 9:
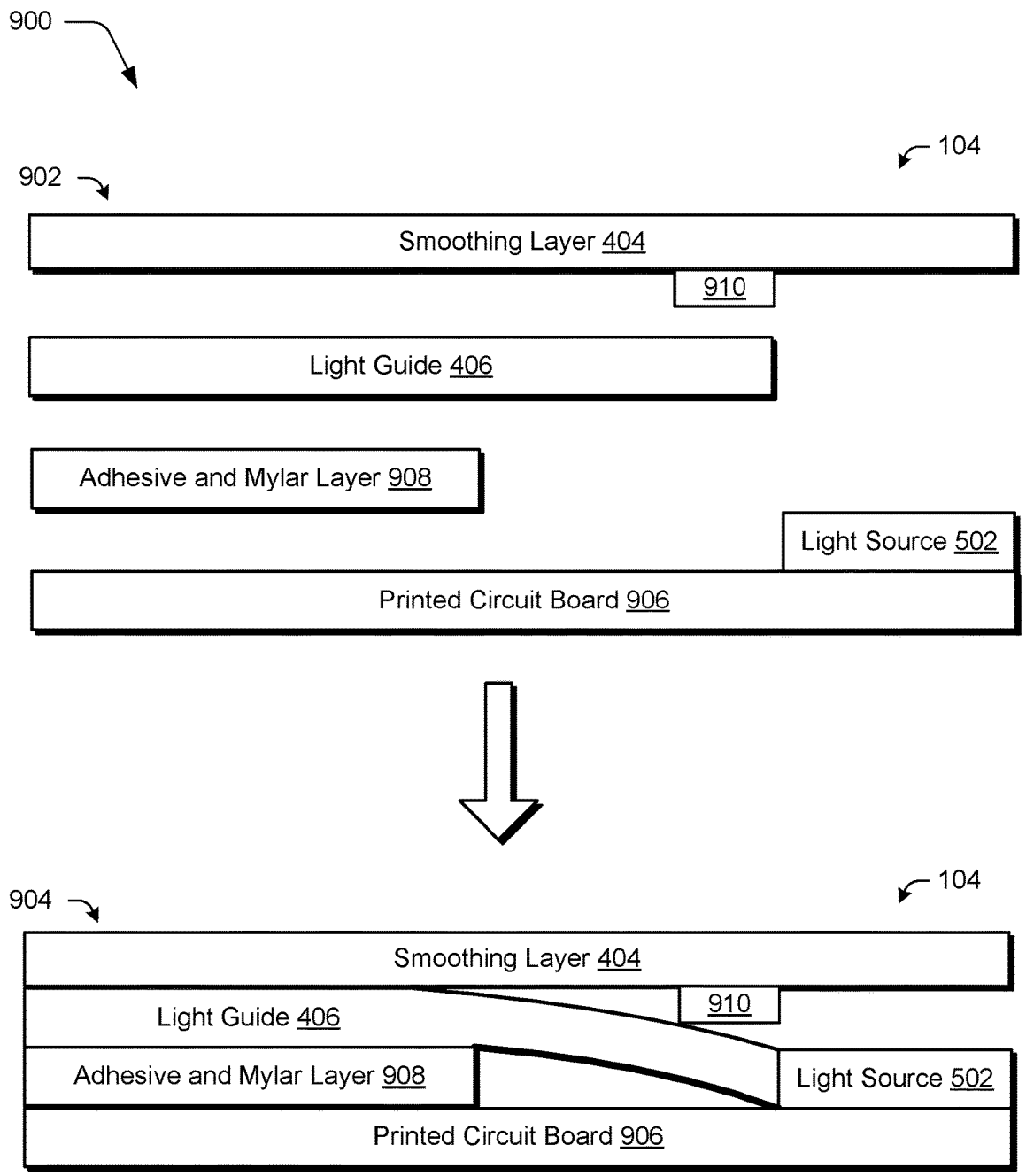
FIG. 9 depicts an example implementation in which a smoothing layer is configured to assist alignment of a light guide with a light source.

FIG. 9 depicts an example implementation 900 in which a smoothing layer 404 is configured to assist alignment of a light guide 406 with a light source 502. This implementation 900 is shown using first and second stages 902, 904. At the first stage 902, layers of the input device 104 are shown that include the smoothing layer 404, light guide 406, a printed circuit board 906 that includes a light source 502, and an adhesive and Mylar layer 908 that is configured to secure the light guide 406 to the printed circuit board 906. The adhesive and Mylar layer 908 are illustrated as having a thickness (e.g., height in the figure) that substantially corresponds to a height of the light source 502. The adhesive and Mylar layer 908 may be formed in a variety of ways, such as a white material that is configured to reflect light emitted by the light guide 406. The layers of the first stage 902 may then be assembled as shown in the second stage 904.

At the second stage 904, the layers of the first stage 902 are brought together and secured to each other, e.g., through use of an adhesive. This causes a protrusion 910 formed on the smoothing layer 404 to contact the light guide 406. This causes the light guide 406 to deflect (e.g., bend) toward the light source 502 such that an edge of the light guide 406 is positioned to receive light emitted by the light source 502 in an opening formed between the adhesive and Mylar layer 908 and the light source 502. Thus, the protrusion 910 may be configured to address differences in positioning of a light source 502 and light guide 406 at different levels within the input device 104 yet still promote thinness of the input device 104 as a whole. The light guide 406 may be configured in a variety of ways to support this bending, an example of which is described as follows and shown in a corresponding figure.

Figure 10:
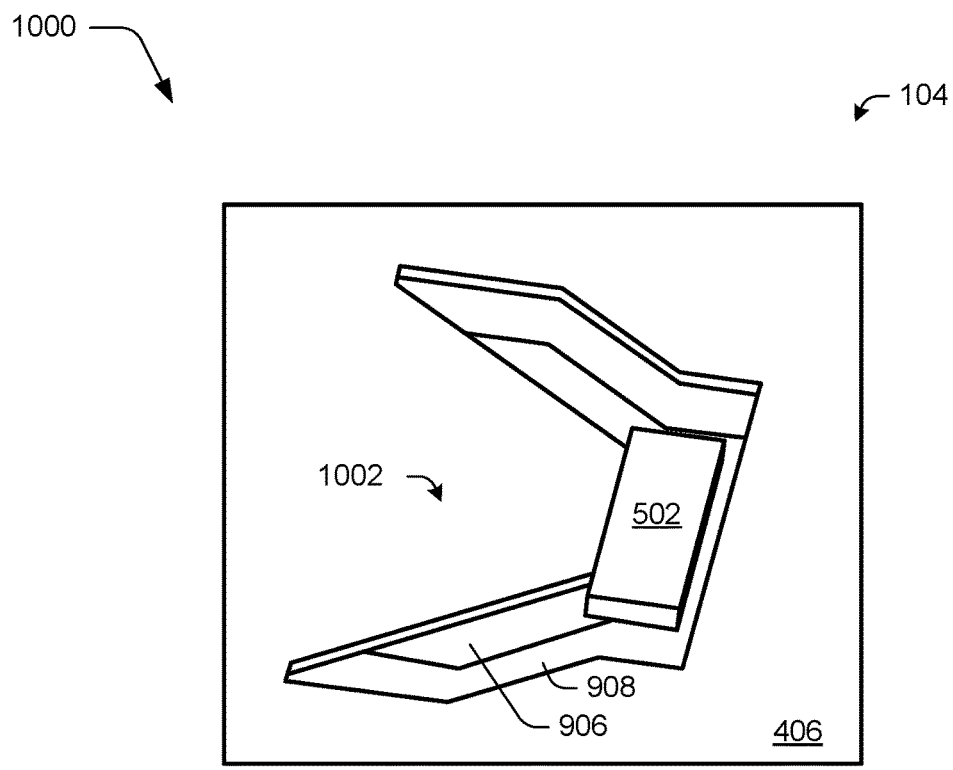
FIG. 10 depicts an example implementation showing a light guide configured to flex in response to pressure applied by the protrusion on the smoothing layer of FIG. 9 to align the light guide with a light source.

FIG. 10 depicts an example implementation 1000 showing a light guide 406 configured to flex in response to pressure applied by the protrusion 910 on the smoothing layer 404 of FIG. 9 to align the light guide 406 with a light source 502. In this example implementation 1000, a perspective view is shown of a top surface of the light guide 406. The light guide 406 is disposed above the adhesive and Mylar layer 908 (e.g., which may be white to promote reflection as previously described), which is disposed above a printed circuit board 906, to which, the light source 502 is secured.

The light guide 406 is configured in this instance to include a tab 1002 that is to be deflected as shown in FIG. 9 to align an edge with an output of the light source 502. For instance, a tab 1002 may be caused to bend approximately 100 microns to align at an approximate center of a 0.4 millimeter height of an output of the light source 502. The light guide 406 may be configured in a variety of other ways to promote an optical connection between the light guide 406 and a light source 502, such as a protrusion on the light guide 406 itself that is configured to transmit light and so on.

Figure 11:
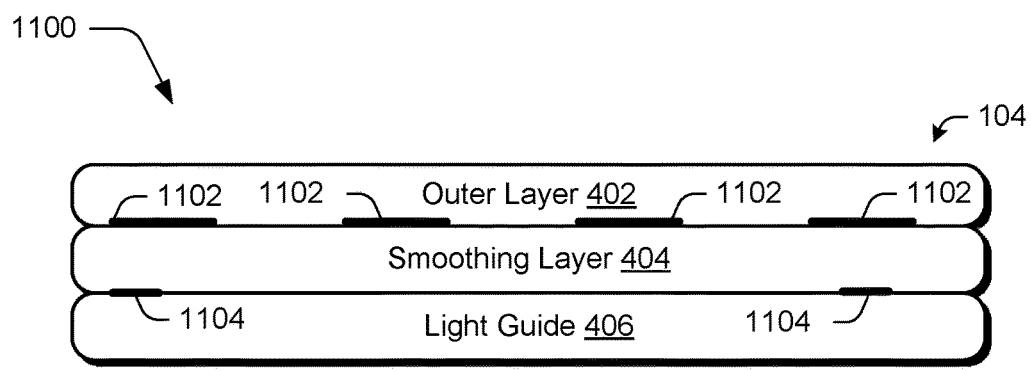
FIG. 11 depicts an example implementation in which a smoothing layer is configured to reduce wrinkling of an outer layer and reduce the bleeding of light from a light guide.

FIG. 11 depicts an example implementation in which a smoothing layer 404 is configured to reduce wrinkling of an outer layer 402 and reduce the bleeding of light from the light guide 406. As previously described, changes made to a surface of a light guide 406 may cause light to be emitted from those areas. For example, adhesives may cause light output at portions of a surface of the light guide that contact the adhesive. Additionally, the outer layer 402 may be configured as a fabric and thus be susceptible to wrinkles if not sufficiently secured to a surface.

Accordingly, in this example the smoothing layer 404 is configured to secure the outer layer 402 in a manner that reduces wrinkling 1102 using adhesives 1102 at a plurality of locations along a surface of the smoothing layer 404. The adhesive 1102 may be applied in a variety of different locations, such as in galleys between indications of inputs on the input device 104. In this way, the outer layer 402 may form a laminate structure with the smoothing layer 404, thereby reducing flexibility of the fabric and consequently susceptibility of the fabric of the outer layer 402 to wrinkling.

Additionally, adhesive 1104 may also be used to secure the smoothing layer 404 to the light guide 406. As previously described, however, the adhesive 1104 may cause light to leak from the light guide 406. Accordingly, a surface area of the smoothing layer 404 used to secure the outer layer 402 using the adhesive 1102 is greater than a surface area of the smoothing layer 404 that is used by the adhesive 1104 to secure the smoothing layer 404 to the light guide 406. A variety of other examples are also contemplated, such as a density of adhesive usage being greater for the outer layer 402 than the light guide 406 and so on.

Example System and Device

Figure 12:
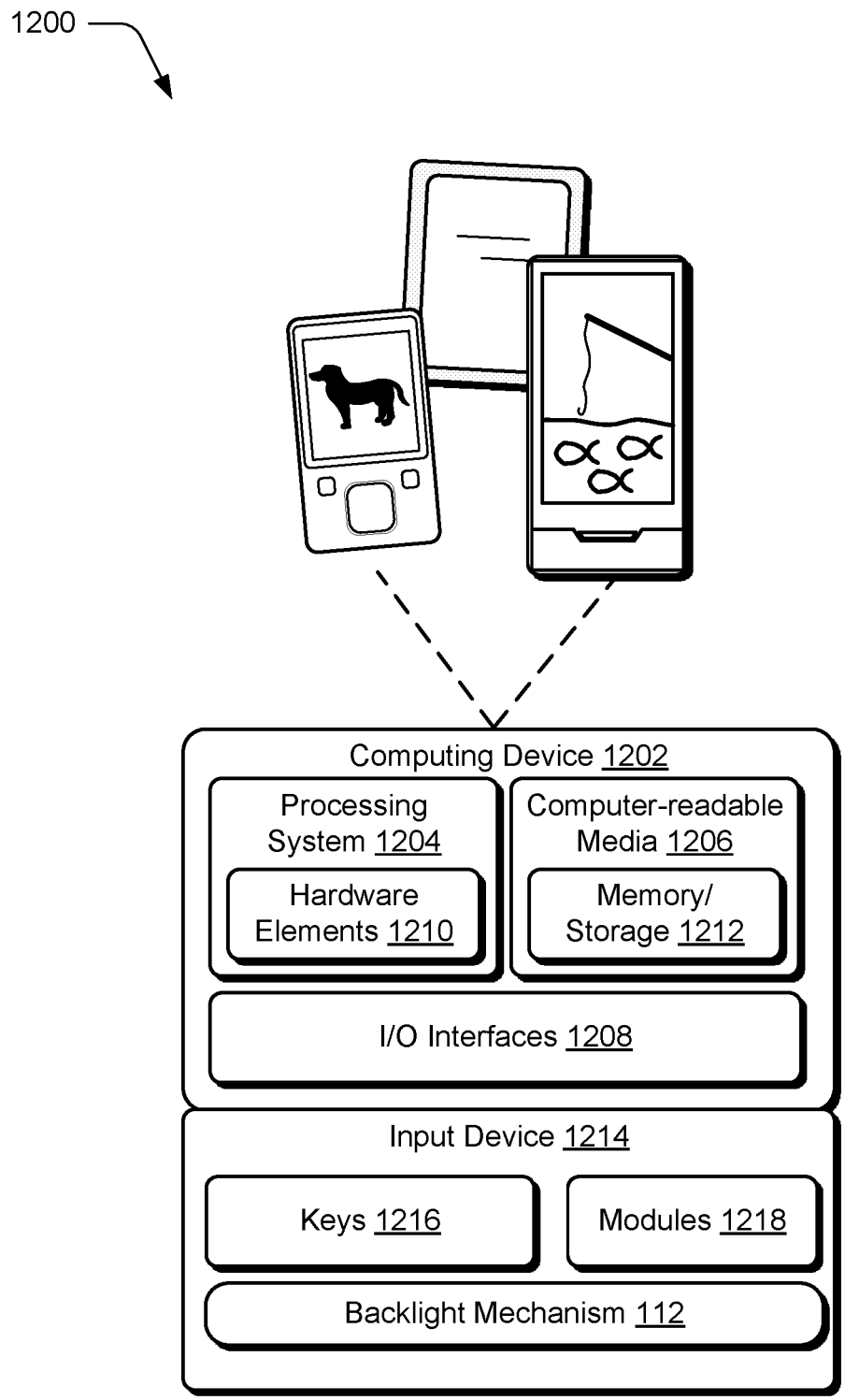
FIG. 12 illustrates an example system generally at that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. The computing device 1202 may be, for example, be configured to assume a mobile configuration through use of a housing formed and size to be grasped and carried by one or more hands of a user, illustrated examples of which include a mobile phone, mobile game and music device, and tablet computer although other examples are also contemplated. The input device 1214 may also be configured to incorporate a backlight mechanism 112 as previously described.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways to support user interaction.

The computing device 1202 is further illustrated as being communicatively and physically coupled to an input device 1214 that is physically and communicatively removable from the computing device 1202. In this way, a variety of different input devices may be coupled to the computing device 1202 having a wide variety of configurations to support a wide variety of functionality. In this example, the input device 1214 includes one or more keys 1216, which may be configured as pressure sensitive keys, mechanically switched keys, and so forth.

The input device 1214 is further illustrated as include one or more modules 1218 that may be configured to support a variety of functionality. The one or more modules 1218, for instance, may be configured to process analog and/or digital signals received from the keys 1216 to determine whether a keystroke was intended, determine whether an input is indicative of resting pressure, support authentication of the input device 1214 for operation with the computing device 1202, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
a light guide configured to transmit light; and
an outer layer disposed proximal to the light guide, the outer layer having a plurality of indications of inputs formed using openings in the outer layer such that light from the light guide is configured to pass through the openings to function as a backlight, the outer layer having a plurality of sub-layers arranged to have increasing levels of resistance to transmission of the light from the light guide, one to another.

2. The input device as described in claim 1, wherein the plurality of sub-layers are arranged in an order of increasingly lighter shades as positioned away from the light guide.

3. The input device as described in claim 1, wherein:
an external said sub-layer forms an external surface of the input device;
the external said sub-layer has a color; and
at least one of the sub-layers positioned between the external said sub-layer and the light guide has a darker shade of the color.

4. The input device as described in claim 1, wherein the openings are formed in the outer layer using a laser.

5. The input device as described in claim 1, wherein the light guide is formed with a printed embossing across a surface of the light guide, the printed embossing configured to allow the light to be brought out specific portions of a surface of the light guide such that the specific portions are configured to output light and other portions that do not include the printed embossing are not so configured.

6. The input device as described in claim 1, further comprising:
a sensor assembly having a plurality of sensors that are configured to detect proximity of an object as a corresponding one or more inputs;
a connection portion configured to form a communicative coupling to a computing device to communicate the one or more inputs received by the sensor assembly to the computing device; and
a smoothing layer disposed between the light guide and the outer layer.

7. The input device as described in claim 6, wherein the outer layer is secured to the smoothing layer using an adhesive and also secured to the light guide using an adhesive.

8. The input device as described in claim 7, wherein a surface area of the smoothing layer used to secure the outer layer using the adhesive is greater than a surface area of the smoothing layer that is used to secure the smoothing layer to the light guide.

9. The input device as described in claim 6, wherein the smoothing layer includes one or more portions that are masked to restrict light transmission through the one or more portions.

10. The input device as described in claim 9, wherein at least one said portion is disposed proximal to a light source of the light guide.

11. The input device as described in claim 9, wherein the one or more portions of the smoothing layer are masked by printing an ink on the smoothing layer.

12. The input device as described in claim 6, wherein the smoothing layer includes a protrusion configured to cause the light guide to align with a light source.

13. An input device comprising:
a light guide configured to transmit light;
an outer layer formed as a fabric that has one or more indications of inputs that are configured to be illuminated by the light guide; and
a smoothing layer disposed between the light guide and the outer layer, the smoothing layer secured to the outer layer thereby reducing flexibility of the fabric, the smoothing layer including a protrusion configured to cause the light guide to align with a light source.

14. The input device as described in claim 13, wherein:
the outer layer is secured to the smoothing layer using an adhesive and also secured to the light guide using an adhesive; and
a surface area of the smoothing layer used to secure the outer layer using the adhesive is greater than a surface area of the smoothing layer that is used by the adhesive to secure the smoothing layer to the light guide.

15. The input device as described in claim 13, wherein the smoothing layer includes one or more portions that are masked to restrict light transmission through the one or more portions.

16. The input device as described in claim 15, wherein at least one said portion is disposed proximal to a light source of the light guide.

17. The input device as described in claim 13, further comprising a sensor assembly having a plurality of sensors that are configured to detect proximity of an object as a corresponding one or more inputs, and wherein the outer layer is positioned such that the light guide is disposed between the sensor assembly and the outer layer.

18. The input device comprising:
a light source;
a light guide configured to transmit light emitted by the light source;
an outer layer having one or more indications of inputs that are configured to be illuminated by the transmitted light of the light guide; and
a smoothing layer disposed between the light guide and the outer layer, the smoothing layer including a protrusion configured to cause the light guide to align with the light source to transmit the light emitted by the light source.

19. The input device as described in claim 18, wherein the protrusion causes a tab formed in the light guide to bend toward the light source thereby aligning light emitted by the light source with an edge of the light guide.

20. The input device as described in claim 18, further comprising a sensor assembly having a plurality of sensors that are configured to detect proximity of an object as corresponding one or more inputs, and wherein the sensor assembly includes one or more pressure sensitive sensors.

* * * * *